(12) United States Patent
Oyama

(10) Patent No.: US 10,793,141 B2
(45) Date of Patent: Oct. 6, 2020

(54) VEHICLE TRAVELING CONTROL APPARATUS

(71) Applicant: SUBARU CORPORATION, Tokyo (JP)

(72) Inventor: Hajime Oyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 259 days.

(21) Appl. No.: 15/866,334

(22) Filed: Jan. 9, 2018

(65) Prior Publication Data

US 2018/0273026 A1 Sep. 27, 2018

(30) Foreign Application Priority Data

Mar. 27, 2017 (JP) .................................. 2017-060745

(51) Int. Cl.
| | |
|---|---|
| *B60W 30/045* | (2012.01) |
| *B62D 15/02* | (2006.01) |
| *B60W 40/114* | (2012.01) |
| *B62D 6/00* | (2006.01) |
| *B60W 40/072* | (2012.01) |

(52) U.S. Cl.
CPC ........ *B60W 30/045* (2013.01); *B60W 40/072* (2013.01); *B60W 40/114* (2013.01); *B62D 6/003* (2013.01); *B62D 15/025* (2013.01); *B60W 2720/14* (2013.01)

(58) Field of Classification Search
None
See application file for complete search history.

(56) References Cited

U.S. PATENT DOCUMENTS

| | | | | |
|---|---|---|---|---|
| 2014/0012469 A1* | 1/2014 | Kunihiro | ................ | B62D 6/001 |
| | | | | 701/41 |
| 2015/0298694 A1* | 10/2015 | Park | ...................... | B60W 10/18 |
| | | | | 701/41 |
| 2016/0091325 A1* | 3/2016 | Takamatsu | ............ | B60W 30/10 |
| | | | | 701/408 |

FOREIGN PATENT DOCUMENTS

JP        2010-036757 A        2/2010

* cited by examiner

*Primary Examiner* — Lail A Kleinman
(74) *Attorney, Agent, or Firm* — McDermott Will & Emery LLP

(57) ABSTRACT

A vehicle traveling control apparatus includes a calculator, a first controller, a second controller, a switcher, and a third controller. The calculator is configured to calculate a target steering angle, on a basis of a shape of a target course. The first controller is configured to perform a first steering control. The second controller is configured to perform a second steering control. The switcher is configured to switch, on a basis of the shape of the target course, between the first steering control and the second steering control. The third controller is configured to calculate, on a basis of a feedback control amount, a yaw moment to be added to an own vehicle, and control, on a basis of the calculated yaw moment, a distribution of braking/driving force to be distributed to wheels of the own vehicle. The feedback control amount causes the own vehicle to travel while allowing a displacement amount of the own vehicle relative to the target course to be reduced.

11 Claims, 9 Drawing Sheets

VEHICLE TRAVELING CONTROL APPARATUS

CROSS-REFERENCE TO RELATED APPLICATIONS

The present application claims priority from Japanese Patent Application No. 2017-060745 filed on Mar. 27, 2017, the entire contents of which are hereby incorporated by reference.

BACKGROUND

The technology relates to a vehicle traveling control apparatus that so controls an own vehicle as to travel along a target course.

Techniques related to a driving assist control and an automatic driving control have been developed and put into practical use for vehicles such as automobiles. The driving assist control and the automatic driving control each cause an own vehicle to travel along a target course by means of a steering control.

For example, Japanese Unexamined Patent Application Publication (JP-A) No. 2010-36757 discloses a technique in which first steering force is set by a feedback control directed to a steering angle, and in which second steering force is set by a feedforward control that is directed to steering force and based on a target steering angle and a quantity related to a vehicle state. The disclosed technique varies a ratio between the first steering force and the second steering force in accordance with a traveling situation.

SUMMARY

In general, what is desired for a vehicle traveling control apparatus is to achieve a favorable steering control.

It is desirable to provide a vehicle traveling control apparatus that is able to achieve a favorable steering control.

An aspect of the technology provides a vehicle traveling control apparatus that includes: a calculator configured to calculate a target steering angle directed to a feedforward control, on a basis of a shape of a target course upon a traveling control that causes an own vehicle to travel along the target course; a first controller configured to calculate following torque on a basis of the target steering angle, and perform a first steering control on a steering system of the own vehicle on a basis of the calculated following torque, in which the following torque allows the own vehicle to follow the target course while placing priority on override performed by a driver of the own vehicle; a second controller configured to calculate steering angle deviation between the target steering angle and an actual steering angle of the own vehicle, and perform a second steering control on the steering system on a basis of the calculated steering angle deviation; a switcher configured to switch, on a basis of the shape of the target course, between the first steering control performed by the first controller and the second steering control performed by the second controller; and a third controller configured to calculate, on a basis of a feedback control amount, a yaw moment to be added to the own vehicle, and control, on a basis of the calculated yaw moment, a distribution of braking/driving force to be distributed to a plurality of wheels of the own vehicle. The feedback control amount causes the own vehicle to travel while allowing an amount of displacement of the own vehicle relative to the target course to be reduced.

An aspect of the technology provides a vehicle traveling control apparatus including circuitry configured to calculate a target steering angle directed to a feedforward control, on a basis of a shape of a target course upon a traveling control that causes an own vehicle to travel along the target course, calculate following torque on a basis of the target steering angle, in which the following torque allows the own vehicle to follow the target course while placing priority on override performed by a driver of the own vehicle, perform a first steering control on a steering system of the own vehicle on a basis of the calculated following torque, calculate steering angle deviation between the target steering angle and an actual steering angle of the own vehicle, perform a second steering control on the steering system on a basis of the calculated steering angle deviation, switch, on a basis of the shape of the target course, between the first steering control and the second steering control, calculate, on a basis of a feedback control amount, a yaw moment to be added to the own vehicle, in which the feedback control amount causes the own vehicle to travel while allowing an amount of displacement of the own vehicle relative to the target course to be reduced, and control, on a basis of the calculated yaw moment, a distribution of braking/driving force to be distributed to a plurality of wheels of the own vehicle.

DETAILED DESCRIPTION

Figure 1:
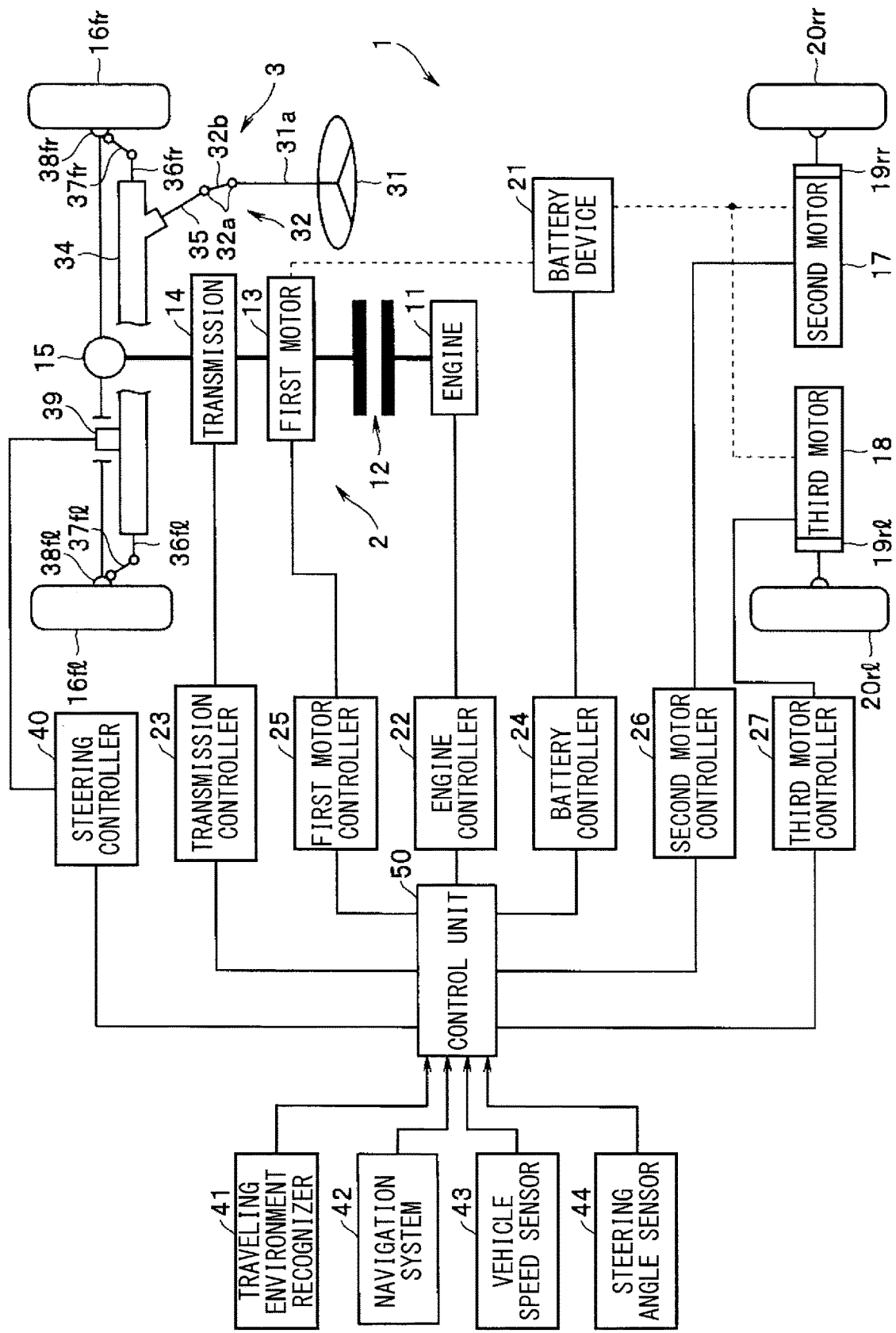
FIG. 1 illustrates an example of an overall configuration of a vehicle provided with a vehicle traveling control apparatus according to one implementation of the technology.

In the following, some implementations of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example implementations which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

Referring to FIG. 1, an own vehicle 1 may include a drive system 2 and a steering system 3. The drive system 2 may have a configuration that allows for four-wheel drive, and may include a front wheel drive force transmission path and a rear wheel drive force transmission path. The front wheel drive force transmission path may have an engine 11, a clutch mechanism 12, a first motor 13, a transmission 14, a reduction gear device 15, and drive wheels including a front left wheel 16$fl$ and a front right wheel 16$fr$. The rear wheel drive force transmission path may have a second motor 17, a third motor 18, reduction gear devices including a left reduction gear device 19$rl$ and a right reduction gear device 19$rr$, and drive wheels including a rear left wheel 20$rl$ and a rear right wheel 20$rr$.

The front wheel drive force transmission path may cause drive force derived from the engine 11 and drive force derived from the first motor 13 to be transmitted, through the transmission 14 and the reduction gear device 15, to the front drive wheels including the front left wheel 16$fl$ and the front right wheel 16$fr$. The rear wheel drive force transmission path may cause drive force derived from the second motor 17 to be transmitted to the rear right wheel 20$rr$ through the right reduction gear device 19$rr$, and may cause drive force derived from the third motor 18 to be transmitted to the rear left wheel 20$rl$ through the left reduction gear device 19$rl$.

The first motor 13 may be driven by electric power stored in a battery device 21. The first motor 13 may also generate electric power by being rotated by means of torque outputted from the engine 11 to allow the thus-generated electric power to be stored in the battery device 21. The second motor 17 and the third motor 18 each may be driven by the electric power stored in the battery device 21, the electric power generated by the first motor 13, or both.

A state of the battery device 21 may be monitored by a battery controller 24. The battery controller 24 may detect a voltage and a current of the battery device 21 and calculate a state of charge (SOC) of the battery device 21. By performing the detection and the calculation, the battery controller 24 may control the SOC of the battery device 21.

An engine controller 22 may control a throttle position on the basis of an engine torque command value and thereby control the torque of the engine 11. The engine torque command value may be outputted from a control unit 50. A transmission controller 23 may control a transmission speed ratio of the transmission 14 on the basis of a speed change command value outputted from the control unit 50. In one implementation, the control unit 50 may serve as a "vehicle traveling control apparatus" (or may be simply referred to as a "traveling control apparatus"). The traveling control apparatus so controls the own vehicle 1 as to travel along a target course, as described later in greater detail.

A first motor controller 25 may control torque of the first motor 13 on the basis of a first motor torque command value outputted from the control unit 50. Similarly, a second motor controller 26 may control torque of the second motor 17 on the basis of a second motor torque command value outputted from the control unit 50, and a third motor controller 27 may control torque of the third motor 18 on the basis of a third motor torque command value outputted from the control unit 50.

The steering system 3 of the own vehicle 1 may include a steering shaft 31$a$ that extends from a steering wheel 31. The steering shaft 31$a$ may have a front end coupled, through a joint 32, to a pinion shaft 35. The joint 32 may include a universal joint 32$a$ and a joint shaft 32$b$. The pinion shaft 35 may protrude from a steering gear box 34.

A tie rod 36$fl$ may extend from the steering gear box 34 to the front left wheel 16$fl$. A tie rod 36$fr$ may extend from the steering gear box 34 to the front right wheel 16$fr$. The tie rod 36$fl$ may have a tie rod end coupled, through a knuckle arm 37$fl$, to an axle housing 38$fl$ that rotatably supports the front left wheel 16$fl$. The tie rod 36$fr$ may have a tie rod end coupled, through a knuckle arm 37$fr$, to an axle housing 38$fr$ that rotatably supports the front right wheel 16$fr$.

The steering system 3 of the own vehicle 1 may also include an electric power steering (EPS) device 39. The EPS device 39 may be an example of a steering device that allows for free setting of a steering angle independently from an input of steering performed by a driver. The EPS device 39 may drive a power steering mechanism by means of a power steering motor. The power steering mechanism may be, for example but not limited to, a known rack assist power steering mechanism. The EPS device 39 may be driven by an unillustrated power steering motor driver. The power steering motor driver may be controlled on the basis of a signal derived from a steering controller 40.

The control unit 50 may be coupled to a traveling environment recognizer 41, a navigation system 42, and sensors and switches including a vehicle speed sensor 43 and a steering angle sensor 44. The traveling environment recognizer 41 may obtain traveling environment information by detecting a traveling environment of the own vehicle 1 under which the own vehicle 1 travels. By obtaining the traveling environment information, the traveling environment recognizer 41 may recognize the traveling environment. The traveling environment recognizer 41 may include a device such as a camera device, a radar device, and sonar. Non-limiting examples of the camera device may include a stereo camera, a monocular camera, and a color camera. Non-limiting examples of the radar device may include LiDAR and millimeter-wave radar. The navigation system 42 may obtain positional information of the own vehicle 1 as own vehicle position information, and thereby display a position of the own vehicle 1 on map information and perform a route guidance to a destination. Non-limiting examples of the own vehicle positional information may include information on latitude, information on longitude, and information on a traveling direction. The vehicle speed sensor 43 may detect a vehicle speed V. The steering angle sensor 44 may detect a steering angle $\delta$.

The traveling environment recognizer 41 may include a set of cameras and a stereo image processor in an example implementation where the traveling environment recognizer 41 includes the stereo camera. The cameras may be so disposed at a front part of a ceiling in a vehicle interior as to have a certain distance in between, and may perform stereo imaging of an object outside the own vehicle 1 from different perspectives. The stereo image processor may process pieces of image data obtained from the cameras.

In an example implementation where the stereo image processor of the traveling environment recognizer 41 processes the pieces of image data obtained from the cameras, the stereo image processor may first obtain a shift amount between corresponding positions in the pair of stereo images. The stereo images as a set may be captured by the respective cameras and directed to a traveling direction of the own vehicle 1. Based on the thus-obtained shift amount, the stereo image processor may obtain distance information and thereby generate a distance image.

In recognition of lane lines such as, but not limited to, white lines, a change in luminance in a width direction of a road may be evaluated on the grounds that the lane lines are higher in luminance than a road surface. By performing the evaluation, positions of the right and the left lane lines in an image plane may be identified on the image plane. Positions in real space (x, y, z) of the lane lines may be calculated by a known expression of coordinate transformation, on the basis of the positions (i, j) on the image plane and a parallax calculated from the positions on the image plane, i.e., based on the distance information. In an example implementation, a coordinate system in the real space, set on the basis of a position of the own vehicle 1 as a reference, may be defined as follows. As illustrated by way of example in FIGS. 3 to 5, a vehicle-width direction may be an x-axis, a vehicle height direction may be a y-axis, and a vehicle length direction, i.e., a distance direction, may be a z-axis, where the road surface immediately below a position in the midpoint of the stereo cameras is defined as the origin. An x-z plane where y equals to zero (0) is coincident with the road surface when the road is flat.

The traveling environment recognizer 41 may also perform a known grouping process, on the basis of data on the distance image that represents a three-dimensional distance distribution. The traveling environment recognizer 41 may then compare the distance information having been subjected to the grouping process with three-dimensional road shape data, three-dimensional object data, etc., which are stored in advance. By making the comparison, the traveling environment recognizer 41 may obtain data on sidewall present along a road and the data on a three-dimensional object. Non-limiting examples of the sidewall may include a guardrail, a curb, and a center divider. The three-dimensional object may be, for example but not limited to, a vehicle. Obtaining the data on the three-dimensional object may allow for determination of a distance relative to the three-dimensional object and a temporal variation in the distance. The temporal variation in the distance may be, in other words, a speed relative to the own vehicle 1.

The navigation system 42 may receive a radio signal from, for example but not limited to, a global positioning system (GPS) satellite to obtain the positional information of the own vehicle 1, such as the information on latitude and the information on longitude. In an example implementation, the navigation system 42 may be a known system. The navigation system 42 may also obtain the vehicle speed V from the vehicle speed sensor 43, and obtain the information on the traveling direction from a sensor such as, but not limited to, a geomagnetic sensor and an angular velocity sensor. The navigation system 42 may include a navigation ECU and a map database which are unillustrated. The navigation ECU may generate route information that allows for a navigation function. The map database stores the map information including supplier data and updated data. The navigation system 42 may output any information from an unillustrated notification device.

The navigation ECU may cause the notification device to display the route information that shows a route to any destination specified by a user. The navigation ECU may also cause the notification device to display a current position of the own vehicle 1, on the basis of information on the detected position, speed, traveling direction, etc., of the own vehicle 1. The navigation ECU may overlay the route information and the current position of the own vehicle 1 on a map image displayed on the notification device. The map database may store information necessary for configuring a road map. The information may include, without limitation, node data and facility data. The node data may be related to a position and a shape of a road which configure the map image. The node data may include data on: a center point in a width direction of a road (i.e., a lane); a coordinate (such as latitude and longitude) of each point (i.e., node points) on a road including a fork (i.e., an intersection) of a road; a direction and a kind (such as information on whether a road is an expressway, a highway, a local street, etc.) of the road that includes the node points; a type of the road with the node points (such as whether the road with the node points is a straight section, an arc section (i.e., an arc-like curved part), and a clothoid curve section (i.e., a part having a relaxation curve)); and a curve curvature (or a radius).

The control unit 50 may execute a traveling assist control on the basis of input signals obtained from the traveling environment recognizer 41, the navigation system 42, the vehicle speed sensor 43, and the steering angle sensor 44. The traveling assist control may set a target course along which the own vehicle 1 is to travel on the basis of the traveling environment information of the own vehicle 1, and cause the own vehicle 1 to travel along a shape of the target course. The traveling assist control directed to the target course may be achieved by executing a steering control and a yaw moment control. The steering control may be performed by the EPS device 39 of the steering system 3. The yaw moment control may be performed by the second motor 17 and the third motor 18 of the drive system 2. In an example implementation, the steering control and the yaw moment control may be executed in parallel.

The steering control performed by the EPS device 39 may be executed as a feedforward control that orients, by means of the steering performed through the steering system 3, the traveling direction of the own vehicle 1 in a direction along the target course. It is to be noted that the steering angle directed to the target course is determined uniquely in accordance with the geometric shape of the target course and vehicle characteristics. Hence, it can be said that the steering control directed to the target course achieves an element of a human machine interface (HMI) that conveys, through a movement of the steering wheel 31, how the own vehicle 1 moves hereafter to the driver visually and sensuously.

In an example implementation, the control unit 50 may calculate a target steering angle δtff directed to the feedforward control, on the basis of a curvature κ. The curvature κ may be an example representative of the shape of the target course. Further, control unit 50 may control the EPS device 39 on the basis of the target steering angle δtff. The steering control performed by the EPS device 39 may be executed as a steering torque control upon regular traveling where, for example, a curve of the target course is relatively gentle. The steering torque control, hereinafter referred to as a "torque control", places priority on a feeling of steering upon override by reducing interference with the operation performed by the driver. The control, however, may be switched to the steering control when a determination is made that responsiveness is insufficient by the torque control in a situation where, for example, the target course has a sharp curve. The steering control, hereinafter referred to as a "steering angle control", may perform feedback of an actual steering angle from the torque control to bring the actual steering angle into coincidence with the target steering angle δtff.

The yaw moment control performed by the second motor 17 and the third motor 18 may be executed as a feedback control that corrects a displacement in position of the own vehicle 1 relative to the target course. The position of the own vehicle 1 may sometimes deviate from the target course upon the steering control directed to the target steering angle δtff. Such positional displacement is caused by uncertainties such as, but not limited to, disturbance and a delay in response of the own vehicle 1. It is advantageous that the positional displacement is reduced at an early stage by the feedback control based on the yaw moment.

It is to be noted that necessity of conveying information to the driver is less for the feedback control based on the yaw moment than for the steering control that has the HMI-like element. In many cases, as for the feedback control based on the yaw moment, conveying the information only turns out to be annoying for the driver. Accordingly, it is advantageous that the feedback control based on the yaw moment is executed in the background as opposed to the steering control.

In an example implementation, the control unit 50 calculates a feedback control amount, and calculates, on the basis of the feedback control amount, a yaw moment Mz to be added to the own vehicle 1. Further, the control unit 50 controls, by the second motor 17 and the third motor 18, a braking/driving force distribution on the basis of the yaw moment Mz. The feedback control amount so causes the own vehicle 1 that an amount of displacement of the own vehicle 1 relative to the target course is reduced. In an alternative implementation, the feedback control amount may so cause the own vehicle 1 that the amount of displacement of the own vehicle 1 relative to the target course becomes zero. The braking/driving force distribution is a distribution of braking/driving force to be distributed between the right and the left wheels.

Figure 2:
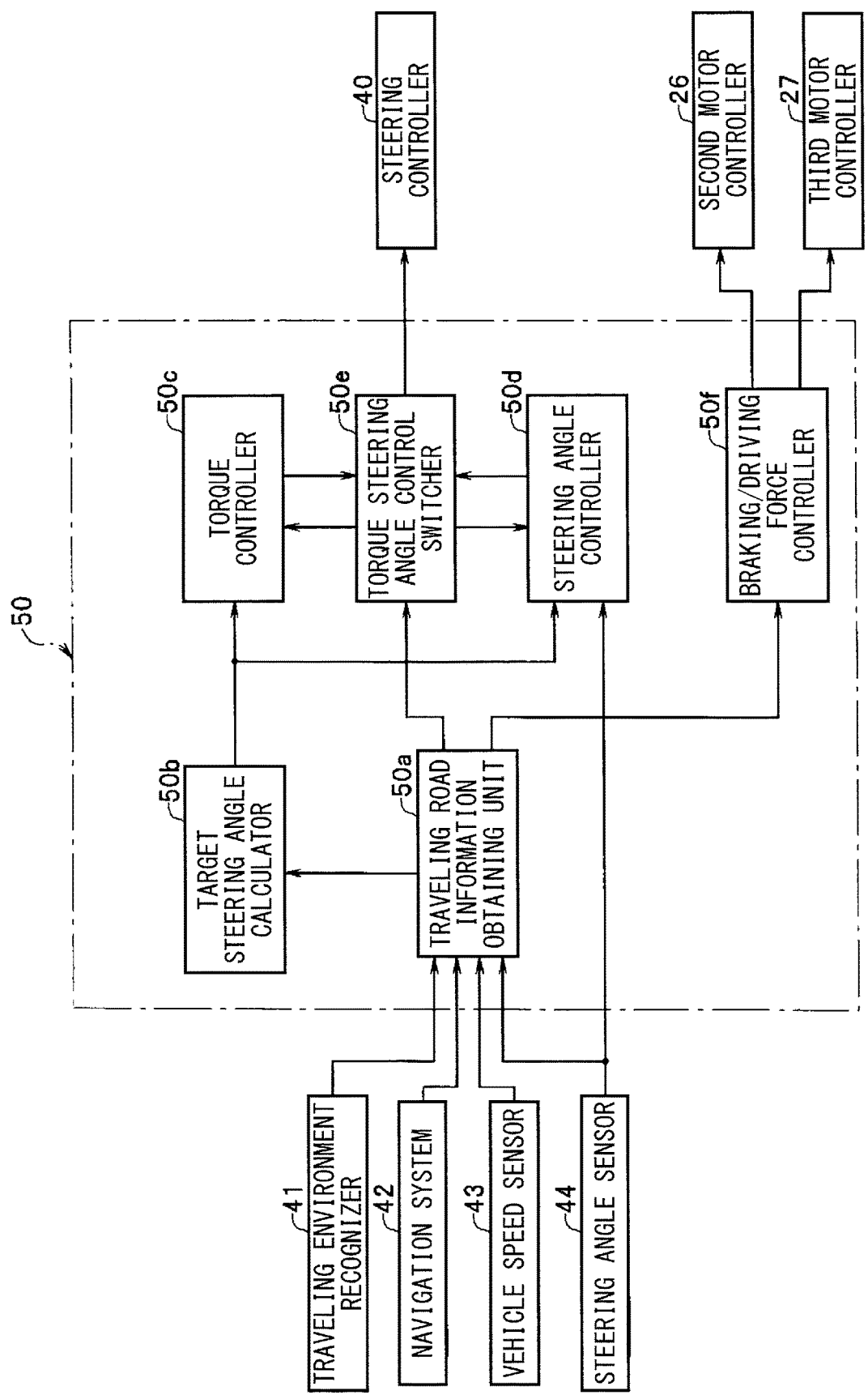
FIG. 2 describes an example of functional blocks of a control unit illustrated in FIG. 1.

To achieve functions that perform the foregoing control, the control unit 50 may include a traveling road information obtaining unit 50a, a target steering angle calculator 50b, a torque controller 50c, a steering angle controller 50d, a torque steering angle control switcher 50e, and a braking/driving force controller 50f as illustrated in FIG. 2. In one implementation, the target steering angle calculator 50b may serve as a "calculator". In one implementation, the torque controller 50c may serve as a "first controller". In one implementation, the steering angle controller 50d may serve as a "second controller". In one implementation, the torque steering angle control switcher 50e may serve as a "switcher". In one implementation the braking/driving force controller 50f may serve as a "third controller".

The traveling road information obtaining unit 50a may recognize the lane along which the own vehicle 1 is to travel and set the target course, on the basis of the signals obtained from the traveling environment recognizer 41, the navigation system 42, the vehicle speed sensor 43, and the steering angle sensor 44. In an example implementation, the traveling road information obtaining unit 50a may set the middle of the lane, along which the own vehicle 1 is to travel, as the target course. On the basis of the positional information on the lane lines recognized as described above and the positional information on the target course, the traveling road information obtaining unit 50a may calculate: the curvature κ of the target course; a displacement amount Δx, and a displacement amount θt as described by way of example below. The displacement amount Δx is an amount of displacement, at a preset front fixation point (position) and in the width direction of the own vehicle 1, between the target course and the position of the own vehicle 1. The displacement amount θt is an amount of displacement, in angle, between a traveling direction of the target course and the traveling direction of the own vehicle 1.

Figure 3:
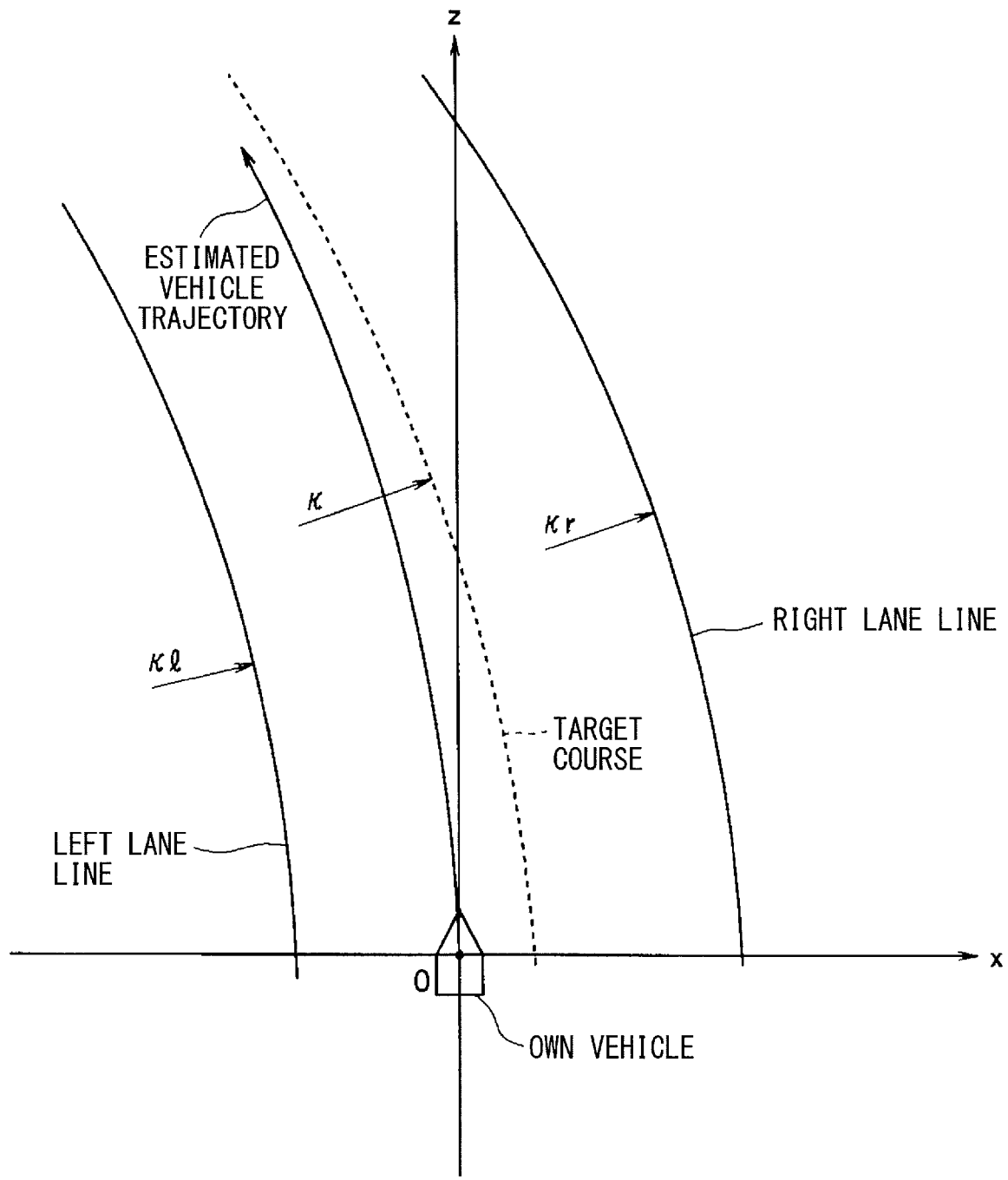
FIG. 3 describes curvature components of a lane.

Referring to FIG. 3, the curvature κ of the target course may be calculated by the following example expression (1):

$$\kappa = (\kappa l + \kappa r)/2 \quad (1)$$

where "κl" denotes a curvature component of a left lane line, and "κr" denotes a curvature component of a right lane line.

In an example implementation, the curvature components "κr" and "κl" of the respective right and left lane lines may be defined for points that configure the respective right and left lane lines as illustrated in FIG. 3, using coefficient of quadratic term that is calculated by a quadratic least square method. For example, when any of the lane lines is approximated by the quadratic expression "x=A·z²+B·z+C", a value "2·A" may be used as the corresponding curvature component. In an alternative implementation, however, the curvature components "κr" and "κl" of the respective right and left lane lines each may be a curvature itself of the corresponding lane line.

Figure 4:
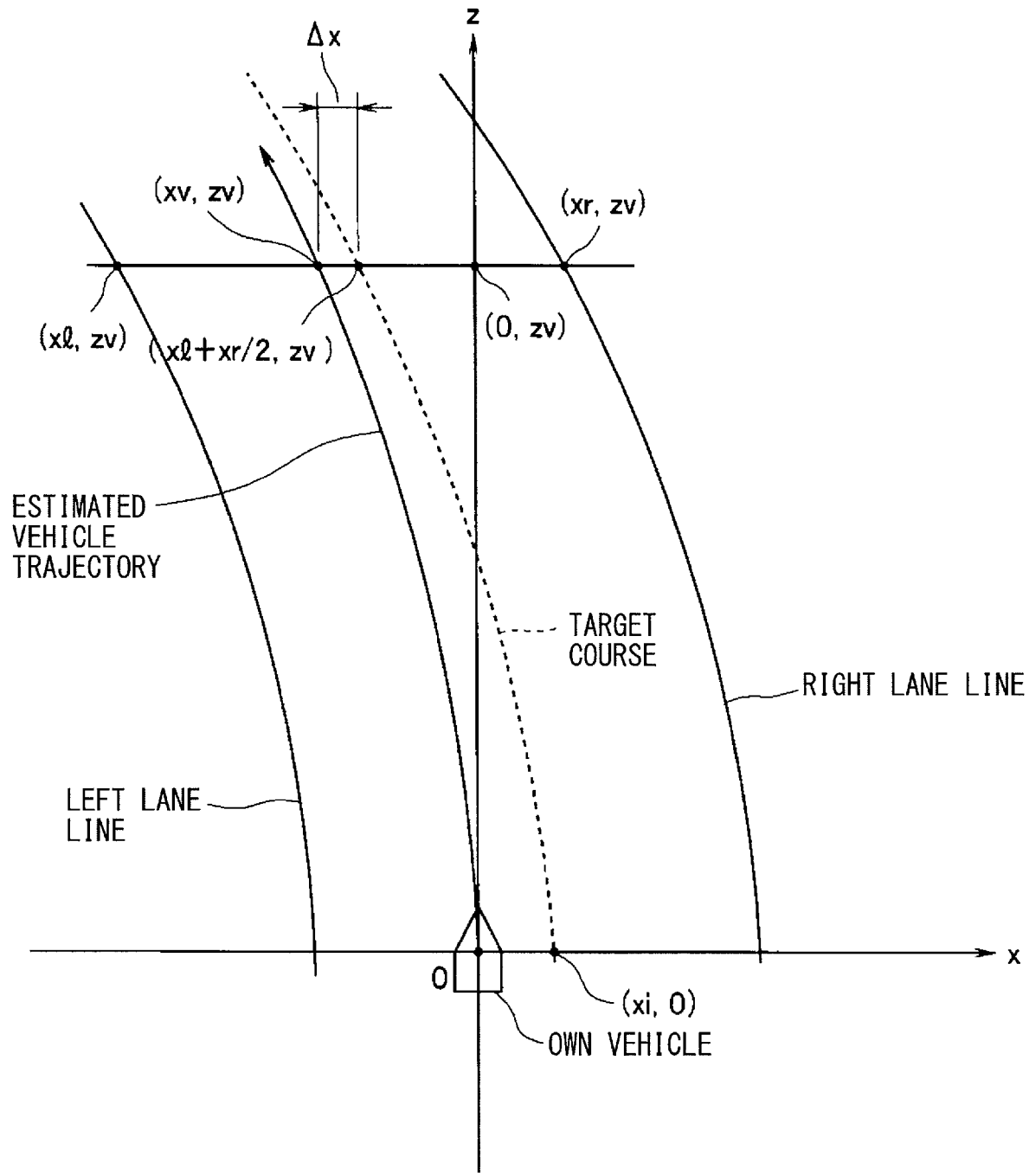
FIG. 4 describes an amount of displacement, in position in a vehicle-width direction, between an estimated vehicle trajectory of an own vehicle and a target course of the own vehicle.

Referring to FIG. 4, the displacement amount Δx as the amount of displacement between the target course and the position of the own vehicle 1 in the width direction of the own vehicle 1 and at the preset front fixation point (position) may be calculated by the following example expression (2):

$$\Delta x = (xl + xr)/2 - xv \quad (2)$$

where "xv" denotes, on estimated vehicle trajectory, an x-coordinate of a point that has a z-coordinate same as a z-coordinate of the front fixation point (0, zv) of the own vehicle 1, "xl" denotes, on the left lane line, an x-coordinate of a point that has a z-coordinate same as the z-coordinate of the front fixation point (0, zv), and "xr" denotes, on the right lane line, an x-coordinate of a point that has a z-coordinate same as the z-coordinate of the front fixation point (0, zv).

Further, a front fixation distance in the z-coordinate from the own vehicle 1 to the front fixation point (0, zv) may be defined as "zv". In an example implementation, the front fixation distance zv may be calculated by the following example expression:

$$zv = tc \cdot V$$

where tc is previously-set prediction time, and may be set to 1.2 seconds in an example implementation. Accordingly, in an example implementation where a stability factor As that is based on specifications of the own vehicle 1 or unique to the own vehicle 1, or any other factor, is used on the basis of a traveling state of the own vehicle 1, "xv" may be calculated by the following example expression (3):

$$xv = (1/2) \cdot (1/(1 + As \cdot V^2)) \cdot (\delta/Lw) \cdot (tc \cdot V)^2 \quad (3)$$

where Lw is a wheelbase.

In an alternative implementation, on the basis of the vehicle speed V and the yaw rate γ, the foregoing xv may be calculated by the following example expression (4).

$$xv = (1/2) \cdot (\gamma/V) \cdot (V \cdot tc)^2 \quad (4)$$

In an alternative implementation, on the basis of the image information, the foregoing xv may be calculated by the following example expression (5).

$$xv = (1/2) \cdot \kappa \cdot (V \cdot tc)^2 \quad (5)$$

It is to be noted that "Δx" may be the same in value as "xi" when "tc" is set to zero. "Xi" is an amount of displacement at the present moment between the target course and the position of the own vehicle 1 as illustrated in FIG. 4. In this case, in an example implementation, Δx may be calculated on the basis of a constant term. For example, the constant term may be used in calculation that is based on a quadratic least square method and performed on the points configuring the respective right and left lane lines that are obtained by the image information. In other words, Δx may be calculated on the basis of a value of "C" used upon approximation of any lane line by the example expression "$x = A \cdot z^2 + B \cdot z + C$".

Figure 5:
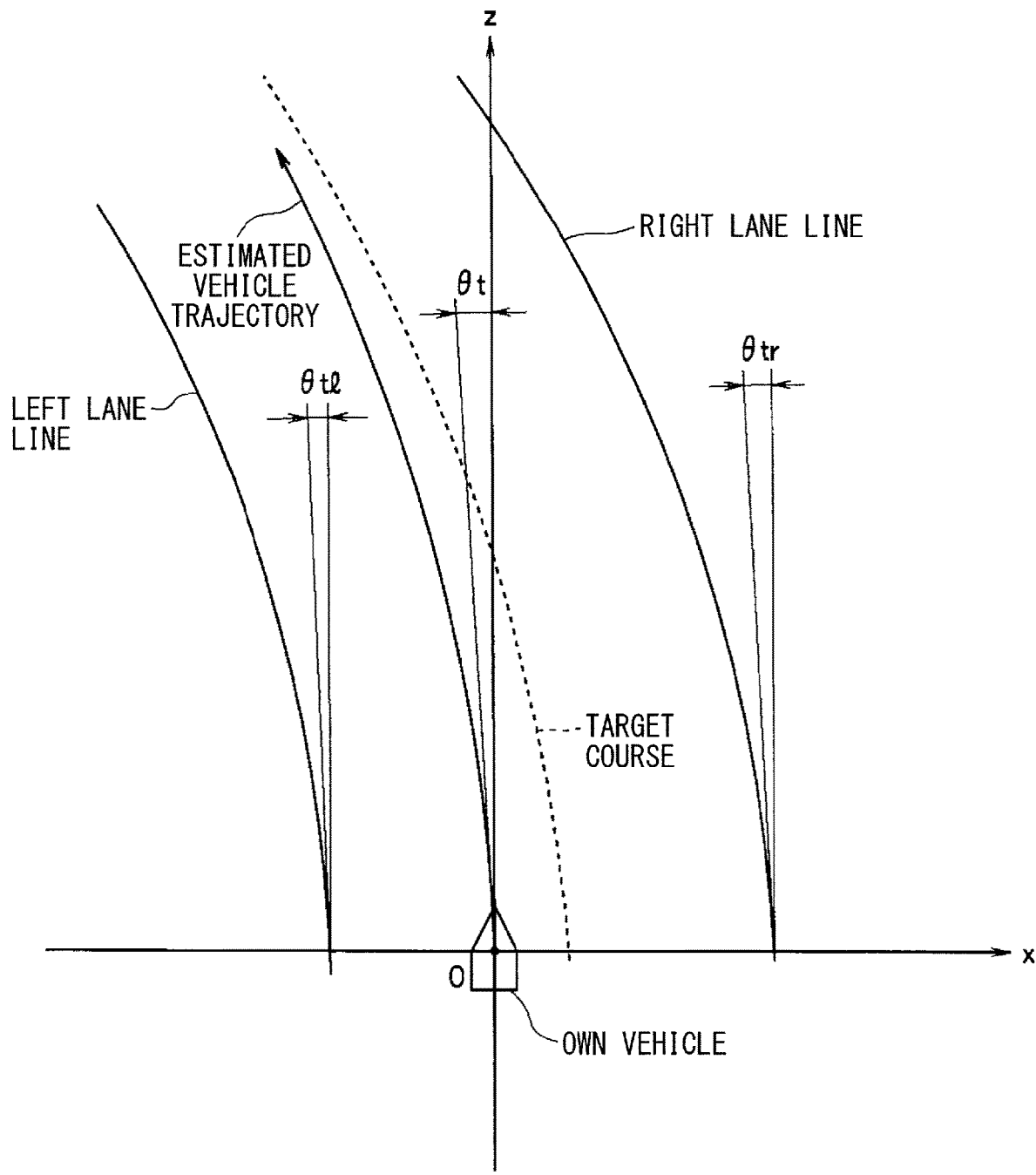
FIG. 5 describes a yaw angle relative to the target course.

Further, referring to FIG. 5, the displacement amount θt as the amount of displacement, in angle, between the traveling direction of the target course and the traveling direction of the own vehicle 1 may be calculated by the following example expression (6):

$$\theta t = (\theta tl + \theta tr)/2 \quad (6)$$

where "θtl" denotes an inclination of the own vehicle 1 relative to the left lane line and "θtr" denotes an inclination of the own vehicle 1 relative to the right lane line as illustrated in FIG. 5.

It is to be noted that, in an example implementation, θtl and θtr each may be calculated on the basis of coefficient of primary term. For example, the coefficient of primary term may be used in calculation that is based on the quadratic least square method and performed on the points configuring the respective right and left lane lines that are obtained by the image information. In other words, θtl and θtr each may be calculated on the basis of a value of "B" used upon the approximation of any lane line by the example expression "$x = A \cdot z^2 + B \cdot z + C$".

The curvature κ of the target course thus calculated may be outputted to the target steering angle calculator 50b and the torque steering angle control switcher 50e. The displacement amount Δx, as the amount of displacement between the target course and the position of the own vehicle 1 at the preset front fixation point (position) and in the width direction of the own vehicle 1, may be outputted to the braking/driving force controller 50f. The displacement amount θt, as the amount of displacement in angle between the traveling direction of the target course and the traveling direction of the own vehicle 1, may also be outputted to the braking/driving force controller 50f.

The target steering angle calculator 50b may calculate, on the basis of the curvature κ of the target course outputted from the traveling road information obtaining unit 50a, the target steering angle δtff directed to the feedforward control performed with respect to the curvature of the target course. The target steering angle calculator 50b may calculate, on the basis of the curvature κ of the target course, the target steering angle δtff by the following example expression (7):

$$\delta tff = Gff \cdot \kappa \quad (7)$$

where "Gff" denotes a feedforward gain. The feedforward gain Gff may be set in advance by experiments, simulations, or other suitable methods. The target steering angle δtff thus calculated may be outputted to the torque controller 50c and the steering angle controller 50d.

The torque controller 50c may calculate, on the basis of the target steering angle δtff calculated by the target steering angle calculator 50b, control torque Tff that is directed to the EPS device 39 and achieves the target steering angle δtff. In one implementation, the control torque Tff may serve as "following torque". The control torque Tff may be torque that allows the own vehicle 1 to follow the target course while placing priority on the override performed by the driver, and allows the steering to be kept at an angular velocity that does not give the driver a sense of discomfort.

Figure 6:
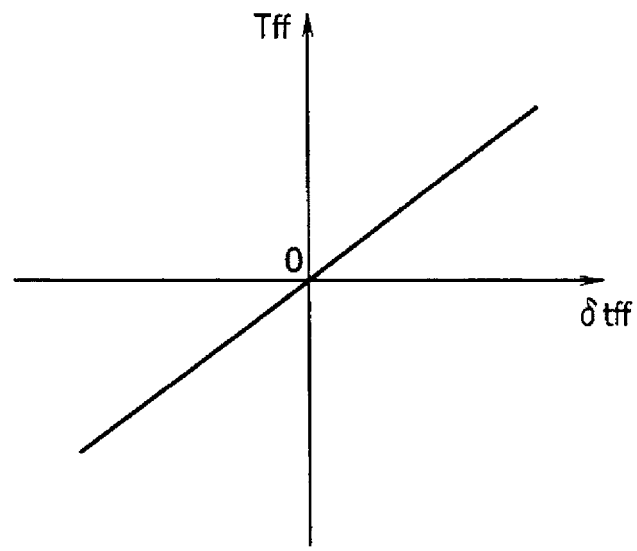
FIG. 6 describes an example of a characteristic map of control torque.

In an example implementation, the control torque Tff may be calculated by referring to a map illustrated by way of example in FIG. 6. The map may be created in advance on the basis of previous calculation of the following torque that does not give the driver a sense of constraint or discomfort upon the override. The previous calculation of the following torque may be performed with respect to a region in which self-aligning torque varies substantially linearly relative to the target steering angle δtff. Such calculation of the following torque may be performed on the basis of experiments, simulations, or other suitable methods. The self-aligning torque may be estimated from a factor such as characteristics based on the specifications of the own vehicle 1, characteristics unique to the own vehicle 1, and the traveling state. By referring to the map, the target steering angle δtff may be converted into the control torque Tff. The control torque Tff may be outputted to the steering controller 40 when the torque steering angle control switcher 50e gives an instruction to execute the torque control.

The steering controller 40 may convert the control torque Tff derived from the torque controller 50c into a current instruction value directed to the power steering motor of the EPS device 39. In an example implementation, the steering controller 40 may perform the conversion by multiplication of a predetermined torque-to-current conversion gain. On the basis of the thus-converted current instruction value, the steering controller 40 may drive the power steering motor. Thus, predetermined steering torque is applied to the steering system 3, making it possible to achieve the steering control that allows for high affinity for the feeling of steering upon the override performed by the driver while allowing the traveling direction of the own vehicle 1 to moderately follow the target course.

The steering angle controller 50d may calculate deviation (or "steering angle deviation") δdev between the target steering angle δtff and an actual steering angle δr detected by the steering angle sensor 44. Further, the steering angle controller 50d may so perform, using the EPS device 39, the steering angle control as to reduce the steering angle deviation δdev, or cause the steering angle deviation δdev to be zero in an example implementation, when the torque steering angle control switcher 50e gives an instruction to switch from the torque control to the steering angle control. In the steering angle control, steering angle control torque Tfb may be calculated on the basis of the steering angle deviation δdev by the following example expression (8).

$$Tfb = Kp \cdot \delta dev + Kd \cdot d\delta dev/dt + Ki \cdot \int \delta dev \, dt \quad (8)$$

The steering angle control torque Tfb expressed by the example expression (8) may be the steering torque that brings the actual steering angle δr into coincidence with the target steering angle δtff by the feedback control that is based on the steering angle deviation δdev. In an example implementation, the steering angle control torque Tfb may be calculated on the basis of a proportional-integral-derivative (PID) control. The PID control may utilize a proportional gain Kp, an integral gain Ki, and a derivative gain Kd that are set optimally in advance by experiments, simulations, or other suitable methods. The steering control based on the steering angle control torque Tfb may possibly cause, in some cases, interference with the operation performed by the driver upon the override and lead to large reaction force.

The steering controller 40 may convert the control torque Tfb derived from the steering angle controller 50*d* into a current instruction value directed to the power steering motor of the EPS device 39. In an example implementation, the steering controller 40 may perform the conversion by multiplication of a predetermined torque-to-current conversion gain. On the basis of the thus-converted current instruction value, the steering controller 40 may drive the power steering motor. Thus, the torque based on the deviation between the target steering angle δtff and the actual steering angle δr is applied to the power steering mechanism of the steering system 3, making it possible to ensure that the own vehicle 1 follows the target course and to prevent deviation of the own vehicle 1 from the target course.

The torque steering angle control switcher 50*e* may monitor the curvature which is an example representative of the shape of the target course. Further, the torque steering angle control switcher 50*e* may selectively switch, on the basis of the curvature κ, between the steering control performed by the torque controller 50*c* and the steering control performed by the steering angle controller 50*d*. In an example implementation, a rate of change (i.e. a curvature change rate) Δκ of the curvature κ of the target course may be compared with a predetermined threshold κH to perform the switching between the torque control and the steering angle control. The threshold κH may be based on, with respect to the control torque Tff of the torque control, the curvature change rate Δκ that corresponds to a limit of following the target course. The threshold κH may be determined in advance by experiments, simulations, or other suitable methods. In an example implementation, the threshold κH may be stored in the control unit 50 as a table value for each control torque Tff.

The torque steering angle control switcher 50*e* may instruct the torque controller 50*c* to execute the torque control and instruct the steering angle controller 50*d* to stop the steering angle control in a case where the curvature change rate Δκ is less than the threshold κH (Δκ<κH). In a case where the curvature change rate Δκ becomes equal to or greater than the threshold κH (Δκ≥κH), the torque steering angle control switcher 50*e* may instruct the torque controller 50*c* to stop the torque control and instruct the steering angle controller 50*d* to execute the steering angle control, thereby switching the steering control from the torque control to the steering angle control.

The torque control performed by the torque controller 50*c* restrains relatively moderately a variation in the steering angle upon causing the own vehicle 1 to travel along the target course so as not to give the driver the sense of constraint or discomfort. However, the torque control performed by the torque controller 50*c* may possibly involve a delay in control and its consequential deviation from the target course when the curve of the target course varies rapidly. Hence, to prevent the deviation from the target course, the steering control according to an example implementation may be switched from the torque control to the steering angle control immediately when the curvature change rate Δκ of the curvature κ becomes equal to or greater than the threshold κH during the execution of the torque control.

In the foregoing example implementation, the switching between the torque control and the steering angle control is performed on the basis of the curvature change rate Δκ of the curvature κ of the target course. In an alternative implementation, the switching between the torque control and the steering angle control may be performed on the basis of the curvature κ of the target course.

In an example implementation, the target course may be corrected and the switching to the steering angle control directed to the corrected target course may be performed even when the target course does not vary sharply, on a condition that, for example but not limited to, an obstacle is present ahead of the own vehicle 1. The steering angle control directed to the corrected target course may include calculating a yaw rate necessary for avoiding the obstacle and correcting the target steering angle on the basis of the calculated yaw rate. In an example implementation, the yaw rate necessary for the avoidance may be calculated on the basis of a yaw angle relative to the obstacle of the own vehicle 1 and an estimated time until which the own vehicle 1 comes into contact with the obstacle. In an alternative implementation, the target course may be corrected and the switching to the steering angle control directed to the corrected target course may be performed on a condition that there is a possibility of deviation of the own vehicle 1 outside any lane line.

The braking/driving force controller 50*f* may calculate the yaw moment Mz to be added to the own vehicle 1, on the basis of the displacement amount as the amount of displacement of the own vehicle 1 relative to the target course. The displacement amount may be received from the traveling road information obtaining unit 50*a*. The yaw moment Mz may compensate the positional displacement of the own vehicle 1 relative to the target course upon the feedforward control of the steering. The yaw moment Mz may be calculated on the basis of one or more of: the displacement amount Δx as the amount of displacement, in the width direction of the own vehicle 1, between the target course and the position of the own vehicle 1; an amount of displacement (i.e., an integrated value of the displacement amount Δx), in the width direction of the own vehicle 1 and resulting from any disturbance that acts on the own vehicle 1, between the target course and the position of the own vehicle 1; and the displacement amount at as the amount of displacement, in angle, between the traveling direction of the target course and the traveling direction of the own vehicle 1.

In an example implementation, the yaw moment Mz to be added to the own vehicle 1 may be calculated by the following example expression (9).

$$Mz = M_{zx} + M_{zix} + M_z\theta \tag{9}$$

Figure 7:
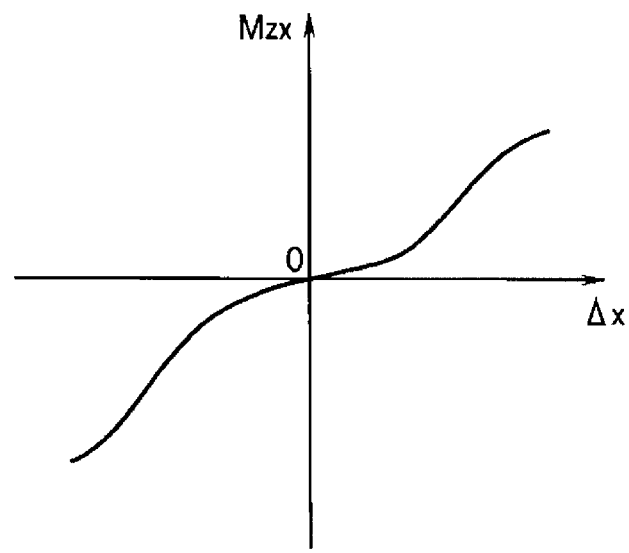
FIG. 7 describes an example of a characteristic map of an additional yaw moment that is set on the basis of the amount of displacement, in the width direction of the own vehicle, between the target course and a position of the own vehicle.

In the example expression (9), "$M_{zx}$" denotes an additional yaw moment set on the basis of the displacement amount Δx as the amount of displacement between the target course and the position of the own vehicle 1 in the width direction of the own vehicle 1 and at the preset front fixation point (position). In an example implementation, the additional yaw moment $M_{zx}$ may be so set as to satisfy characteristics illustrated by way of example in FIG. 7. The additional yaw moment $M_{zx}$ may be set in advance by experiments, simulations, or other suitable methods.

Figure 8:
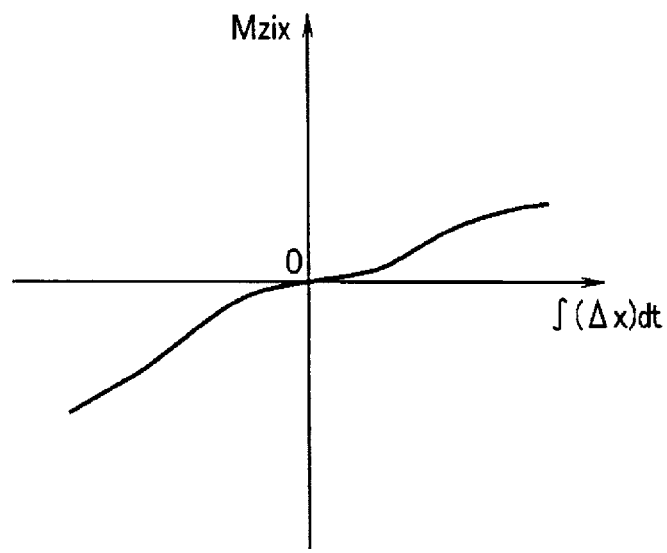
FIG. 8 describes an example of a characteristic map of the additional yaw moment that is set on the basis of the amount of displacement, in the width direction of the own vehicle, between the target course and the position of the own vehicle.

In the example expression (9), "$M_{zix}$" denotes an additional yaw moment set on the basis of the amount of displacement between the target course and the position of the own vehicle 1 in the width direction of the own vehicle 1 and resulting from any disturbance that acts on the own vehicle 1. In an example implementation, the additional yaw moment $M_{zix}$ may be so set as to satisfy characteristics illustrated by way of example in FIG. 8. The additional yaw moment $M_{zix}$ may be set in advance by experiments, simulations, or other suitable methods. In an example implementation, the amount of displacement between the target course and the position of the own vehicle 1 in the width direction of the own vehicle 1 and resulting from any disturbance that acts on the own vehicle 1, may be calculated by integrating the displacement amount Δx in the example expression "∫(Δx)dt".

Figure 9:
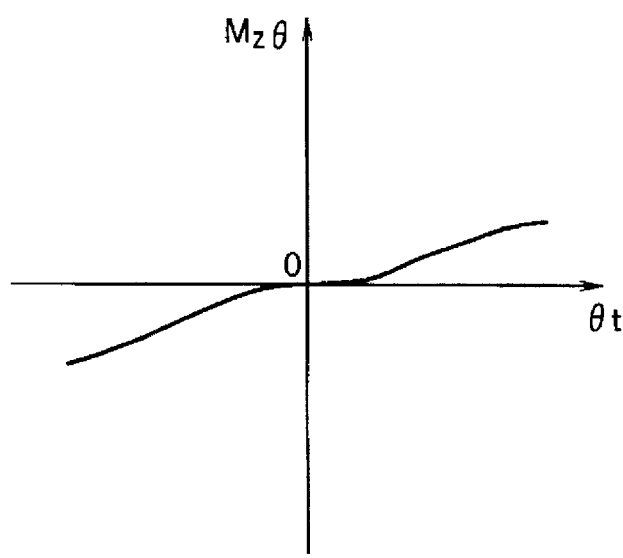
FIG. 9 describes an example of a characteristic map of the additional yaw moment that is set on the basis of the amount of displacement, in the width direction of the own vehicle, between the target course and the position of the own vehicle.

Further, in the example expression (9), "$M_z\theta$" denotes an additional yaw moment set on the basis of the displacement amount θt as the amount of displacement, in angle, between the traveling direction of the target course and the traveling direction of the own vehicle 1. In an example implementation, the additional yaw moment $M_z\theta$ may be so set as to satisfy characteristics illustrated by way of example in FIG. 9. The additional yaw moment $M_z\theta$ may be set in advance by experiments, simulations, or other suitable methods.

The braking/driving force controller 50f may calculate, on the basis of the yaw moment Mz (where a counterclockwise direction is defined as "+") to be added to the own vehicle 1 calculated by the foregoing expression (9), motor torque Trl to be generated for the third motor 18 and motor torque Trr to be generated for the second motor 17 by the following example expressions (10) and (11):

$$Trl = -(rt/d) \cdot \Delta Mz \quad (10)$$

$$Trr = +(rt/d) \cdot \Delta Mz \quad (11)$$

where "rt" denotes a radius of a tire and "d" denotes a tread.

Further, the braking/driving force controller 50f may respectively output the motor torque Trl and the motor torque Trr to the third motor controller 27 and the second motor controller 26 to thereby control, by the second motor 17 and the third motor 18, the braking/driving force distribution as the distribution of braking/driving force to be distributed between the right and the left wheels. Thus, the yaw moment Mz is generated that compensates the positional displacement of the own vehicle 1 relative to the target course upon the feedforward control of the steering, making it possible to ensure an accuracy of following the target course.

It is to be noted that the control on the braking/driving force distribution of the right and the left wheels, performed by the braking/driving force controller 50f, is carried out mainly when the steering control is performed on the basis of the torque control in an example implementation described above. In an alternative implementation, however, the control on the braking/driving force distribution of the right and the left wheels may be carried out also when the switching of the steering control from the torque control to the steering angle control is performed. Further, in an alternative implementation, the control on the braking/driving force distribution may be executed constantly as a background control of the steering control.

Figure 10:
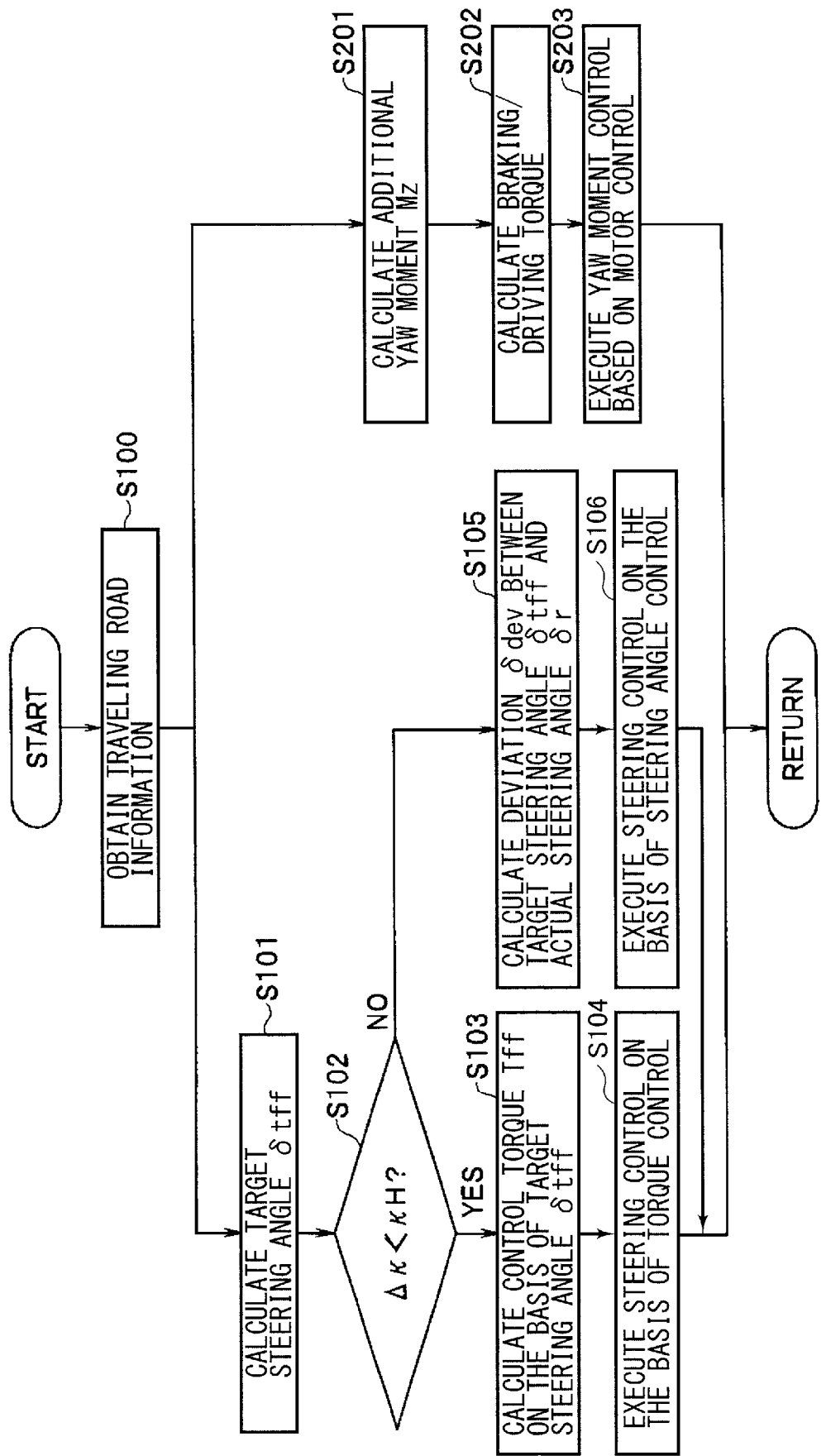
FIG. 10 is a flowchart illustrating an example of program processing of a target course following control.

Next, a description is given, with reference to a flowchart illustrated in FIG. 10, of program processing of a target course following control to be executed by the control unit 50.

In first step S100 of the program processing of the target course following control, a process of the traveling road information obtaining unit 50a may be performed in which the lane along which the own vehicle 1 is to travel is recognized and the middle of the lane, along which the own vehicle 1 is to travel, is set as the target course. On the basis of the positional information on the thus-recognized lane lines and the positional information on the target course, the traveling road information obtaining unit 50a may calculate: the curvature κ of the target course by the foregoing example expression (1); the displacement amount Δx, as the amount of displacement between the target course and the position of the own vehicle 1 at the preset front fixation point (position) and in the width direction of the own vehicle 1, by the foregoing example expression (2); and the displacement amount θt as the amount of displacement, in angle, between the traveling direction of the target course and the traveling direction of the own vehicle 1 by the foregoing example expression (6).

After setting the target course in step S100, processes from step S101 that are related to the steering control based on the EPS device 39 and processes from step S201 that are related to the yaw moment control based on the second motor 17 and the third motor 18 may be executed in parallel. For description purpose, a description is given first of the processes from step S101 that are related to the steering control, followed by a description of the processes from step S201 that are related to the yaw moment control.

In step S101 directed to a process of the steering control, a process of the target steering angle calculator 50b may be performed first in which the target steering angle δtff directed to the feedforward control is calculated by the foregoing example expression (7). Thereafter, the flow may proceed from step S101 to step S102 in which a process of the torque steering angle control switcher 50e may be performed. In step S102, the curvature change rate Δκ of the curvature κ of the target course may be compared with the threshold κH that is set in advance by experiments, simulations, or other suitable methods. Further, on the basis of a result of the comparison, instructions may be given on the execution or the stop of the torque control performed by the torque controller 50c and the steering angle control performed by the steering angle controller 50d.

Specifically, when the result of the comparison between the curvature change rate Δκ and the threshold κH in step S102 indicates that the curvature change rate Δκ is less than the threshold κH (Δκ<κH), the flow may proceed from step S102 to step S103 (step S102: YES). In step S103, a process of the torque controller 50c may be performed in which the control torque Tff is calculated on the basis of the target steering angle δtff, as illustrated by way of example in FIG. 6. Thereafter, in step S104, the steering control performed by the EPS device 39 may be executed on the basis of the torque control.

When the result of the comparison between the curvature change rate Δκ and the threshold κH in step S102 indicates that the curvature change rate Δκ is equal to or greater than the threshold κH (Δκ≥κH), the flow may proceed from step S102 to step S105 (step S102: NO). In step S105, a process of the steering angle controller 50d may be performed in which the deviation δdev between the target steering angle δtff and the actual steering angle δr detected by the steering angle sensor 44 is calculated. Thereafter, in step S106, the steering angle control torque Tfb based on the deviation δdev may be calculated by the foregoing example expression (8), and the calculated steering angle control torque Tfb may be outputted to the steering controller 40. Thus, in step S106, the steering control performed by the EPS device 39 may be executed on the basis of the steering angle control.

As opposed to the steering control performed from step S101, the yaw moment control based on the second motor 17 and the third motor 18 may include the following processes. In step S201, a process of the braking/driving force controller 50f may be performed in which the yaw moment Mz to be added to the own vehicle 1 is calculated by the foregoing example expression (9).

Thereafter, the flow may proceed to step S202. In step S202, a process of the braking/driving force controller 50*f* may be performed in which braking/driving torque, i.e., the motor torque Trl to be generated for the third motor 18 and the motor torque Trr to be generated for the second motor 17, is calculated by the foregoing example expressions (10) and (11). Thereafter, in step S203, the motor torque Trl and the motor torque Trr may be respectively outputted to the third motor controller 27 and the second motor controller 26. Thus, in step S203, the yaw moment control based on the motor control may be executed.

Figure 11:
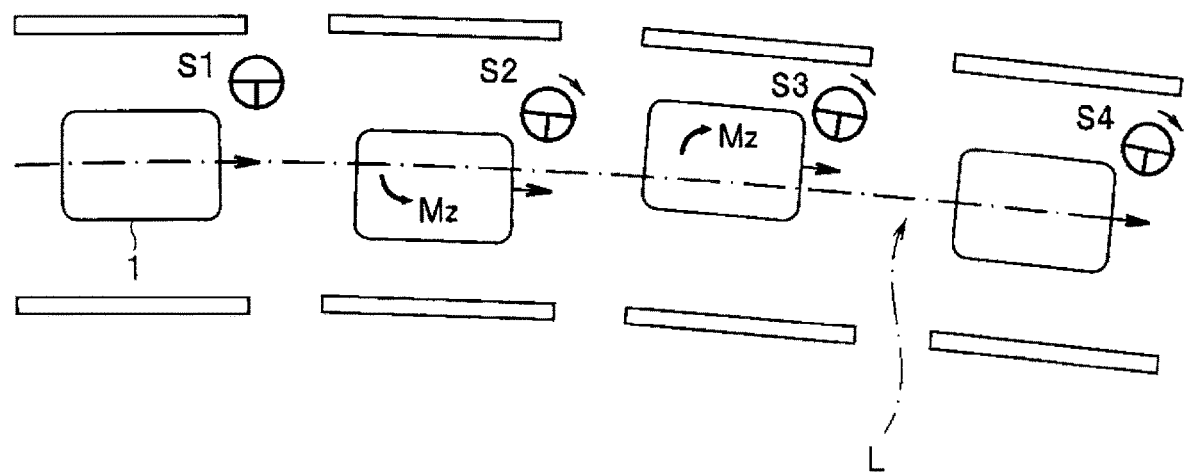
FIG. 11 describes following traveling that causes the own vehicle to follow the target course by means of a torque control.

FIG. 11 illustrates a situation where a variation in curvature of the target course is small and thus the own vehicle 1 travels along the target course (denoted by "L") by the torque control of the steering and the yaw moment control. In such a situation, the control may be so performed that a movement of the steering of the own vehicle 1 is restrained relatively small by placing the priority on the feeling of steering upon the override performed by the driver, and that the positional displacement of the own vehicle 1 relative to the target course L is reduced by the yaw moment Mz added to the own vehicle 1, as illustrated by steering states from S1 to S2, S2 to S3, and S3 to S4 in FIG. 11.

Figure 12:
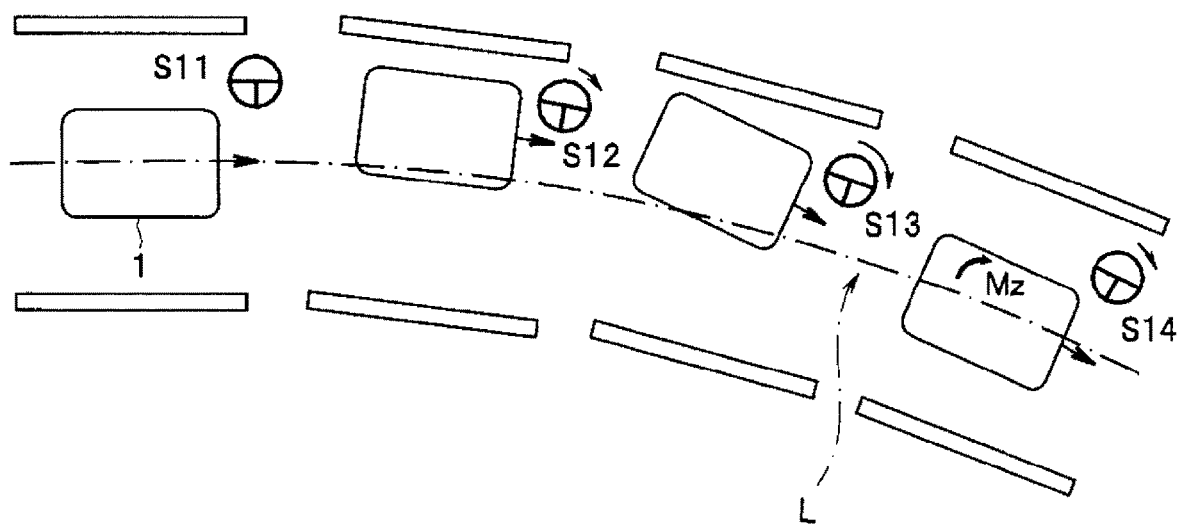
FIG. 12 describes prevention of deviation from the target course by means of a steering angle control.

However, in a situation where the variation in curvature of the target course L becomes large and thus a determination may be made that the control of following the target course L may possibly involve a delay, the steering control may be switched from the torque control to the steering angle control as illustrated in FIG. 12. In such a situation, the switching from the torque control to the steering angle control may be performed when following performance, based on the torque control, of following the target course L reaches a limit from the steering state S11 to the steering state S12. Thus, the steering may be so steered greatly that the own vehicle 1 returns to the target course L as illustrated by the steering state S13. After the own vehicle 1 has returned to the target course L, the regular following traveling that causes the own vehicle 1 to follow the target course L may be performed on the basis of the torque control and the yaw moment control, as illustrated by the steering state S14.

In an example implementation of the technology, the target course along which the own vehicle 1 is to travel is set on the basis of the traveling environment information of the own vehicle 1. Further, the steering control and the yaw moment control may be so executed in parallel as to cause the own vehicle 1 to travel along the target course. The steering control controls the steering system 3 of the own vehicle 1. The yaw moment control is based on the braking/driving force distribution as the distribution of braking/driving force to be distributed to the wheels, e.g., between the right and the left wheels.

During the regular traveling in which the variation in curvature of the target course is relatively small, the steering system 3 is controlled in accordance with the torque control, with respect to the target steering angle that is directed to the feedforward control and follows along the shape of the target course. The torque control is based on the steering torque that takes the override performed by the driver into consideration. However, when the variation in curvature of the target course becomes large, the switching is performed from the torque control to the steering angle control. The steering angle control is performed on the basis of the feedback control and based on the deviation between the target steering angle and the actual steering angle.

Thus, during the regular traveling, it is possible to correct the displacement in position of the own vehicle 1 relative to the target course at an early stage by the feedback control that is based on the yaw moment generated by a difference in braking/driving force between the wheels, while reducing the interference with the operation performed by the driver by means of the torque control directed to the target steering angle. Hence, during the regular traveling, it is possible to reduce the interference with the operation of the steering performed by the driver, while allowing the own vehicle to follow along the target course with accuracy. In addition, the control is switched to the steering angle control that is performed on the basis of the feedback control and based on the deviation between the target steering angle and the actual steering angle when the variation in curvature of the target course becomes large. Hence, it is possible to prevent the deviation from the target course and thereby to ensure safety.

Incidentally, as a steering control directed to a driving assist according to a comparative example, measures may be contemplated in which a ratio, in assigning of control, of first steering force to second steering force is increased when an own vehicle travels on a freeway, for example. The first steering force is set by a feedback control directed to a steering angle. The steering control based on the first steering force, however, leads easily to interference with an operation performed by a driver upon the override owing to its high level of assist. This in turn may possibly give the driver a sense of constraint or discomfort easily.

In contrast, a steering control based on second steering force is able to reduce the sense of constraint or discomfort imposed on the driver. The second steering force is set by a feedforward control that is directed to steering force and based on a target steering angle and a quantity related to a vehicle state. The steering control based on the second steering force, however, involves no feedback directed to a steering angle, leading easily to an accumulation of displacement relative to a target course by uncertainties such as disturbance and a delay in response of a vehicle. Accordingly, it has been difficult for the steering control directed to the driving assist according to the comparative example to achieve a balance between an accuracy of following the target course and a reduction in the interference with the operation performed by the driver.

Although some implementations of the technology have been described in the foregoing with reference to the accompanying drawings, the technology is by no means limited to the implementations described above. For example, an example implementation has been described by referring to a hybrid vehicle that includes the engine 11 and three electric motors including the first motor 13, the second motor 17, and the third motor 18. A vehicle to which any implementation of the technology is applicable, however, is not limited to the hybrid vehicle. Any implementation of the technology is applicable even for an electric vehicle provided with in-wheel motors for respective four wheels, a hybrid vehicle of any other type, or any other vehicle, as long as such a vehicle is able to add the yaw moment to the vehicle by means of the difference in braking/driving force between any right wheel and any left wheel.

The control unit 50 illustrated in FIGS. 1 and 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the control unit 50. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the control unit 50 illustrated in FIGS. 1 and 2.

It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle traveling control apparatus comprising:
   a calculator configured to calculate a target steering angle directed to a feedforward control, based on a shape of a target course upon a traveling control that causes an own vehicle to travel along the target course;
   a first controller configured to calculate following torque based on the target steering angle without being based on steering angle deviation between an actual steering angle of the own vehicle detected by a sensor and the target steering angle, and perform a first steering control on a steering system of the own vehicle with the calculated following torque;
   a second controller configured to calculate the steering angle deviation between the target steering angle and the actual steering angle of the own vehicle, and perform a second steering control on the steering system based on the calculated steering angle deviation;
   a switcher configured to switch, based on the shape of the target course, between the first steering control performed by the first controller and the second steering control performed by the second controller; and
   a third controller configured to calculate, based on a feedback control amount, a yaw moment to be added to the own vehicle, and controls, based on the calculated yaw moment, a distribution of braking/driving force to be distributed to a plurality of wheels of the own vehicle, the feedback control amount causing the own vehicle to travel while allowing an amount of displacement of the own vehicle relative to the target course to be reduced.

2. The vehicle traveling control apparatus according to claim 1, wherein the switcher is configured to switch between the first steering control and the second steering control based on a curvature of the target course.

3. The vehicle traveling control apparatus according to claim 2, wherein the switcher is configured to
   compare a rate of change of the curvature with a threshold,
   cause the first steering control to be executed and causes the second steering control to be stopped when the rate of change of the curvature is less than the threshold, and
   cause the first steering control to be stopped and causes the second steering control to be executed when the rate of change of the curvature is equal to or greater than the threshold.

4. The vehicle traveling control apparatus according to claim 1, wherein the third controller is configured to calculate the yaw moment by utilizing, as the amount of displacement of the own vehicle, one or more of:
   a first displacement amount as an amount of displacement, in a width direction of the own vehicle, between the target course and a position of the own vehicle;
   a second displacement amount as an integrated value of the first displacement amount; and
   a third displacement amount as an amount of displacement, in angle, between a traveling direction of the target course and a traveling direction of the own vehicle.

5. The vehicle traveling control apparatus according to claim 1, wherein the third controller is configured to calculate the yaw moment by utilizing, as the amount of displacement of the own vehicle, one or more of:
   a first displacement amount as an amount of displacement, in a width direction of the own vehicle, between the target course and a position of the own vehicle;
   a second displacement amount as an integrated value of the first displacement amount; and
   a third displacement amount as an amount of displacement, in angle, between a traveling direction of the target course and a traveling direction of the own vehicle.

6. The vehicle traveling control apparatus according to claim 1, wherein the third controller is configured to calculate the yaw moment by utilizing, as the amount of displacement of the own vehicle, one or more of:
   a first displacement amount as an amount of displacement, in a width direction of the own vehicle, between the target course and a position of the own vehicle;
   a second displacement amount as an integrated value of the first displacement amount; and
   a third displacement amount as an amount of displacement, in angle, between a traveling direction of the target course and a traveling direction of the own vehicle.

7. A vehicle traveling control apparatus comprising:
   circuitry configured to:
     calculate a target steering angle directed to a feedforward control, based on shape of a target course upon a traveling control that causes an own vehicle to travel along the target course;
     calculate following torque based on the target steering angle without being based on steering angle deviation between an actual steering angle of the own vehicle detected by a sensor and the target steering angle;
     perform a first steering control on a steering system of the own vehicle with the calculated following torque
     calculate the steering angle deviation between the target steering angle and the actual steering angle of the own vehicle;
     perform a second steering control on the steering system based on the calculated steering angle deviation;
     switch, based on the shape of the target course, between the first steering control and the second steering control;
     calculate, based on a feedback control amount, a yaw moment to be added to the own vehicle, the feedback control amount causing the own vehicle to travel while allowing an amount of displacement of the own vehicle relative to the target course to be reduced; and control, based on the calculated yaw moment, a distribution of braking/driving force to be distributed to a plurality of wheels of the own vehicle.

8. A vehicle traveling control method comprising:

calculating a target steering angle directed to a feedforward control, based on a shape of a target course upon a traveling control that causes an own vehicle to travel along the target course;

calculating following torque based on the target steering angle without being based on steering angle deviation between an actual steering angle of the own vehicle detected by a sensor and the target steering angle;

performing a first steering control on a steering system of the own vehicle with the calculated following torque;

calculating the steering angle deviation between the target steering angle and the actual steering angle of the own vehicle;

performing a second steering control on the steering system based on the calculated steering angle deviation;

switching, based on the shape of the target course, between the first steering control and the second steering control;

calculating, based on a feedback control amount, a yaw moment to be added to the own vehicle, the feedback control amount causing the own vehicle to travel while allowing an amount of displacement of the own vehicle relative to the target course to be reduced; and controlling, based on the calculated yaw moment, a distribution of braking/driving force to be distributed to a plurality of wheels of the own vehicle.

9. The vehicle traveling control apparatus according to claim 1, wherein the first controller is configured to prioritize an override performed by a driver of the own vehicle over the first steering control.

10. The vehicle traveling control apparatus according to claim 7, wherein, the circuitry is configured to prioritize an override performed by a driver of the own vehicle over the first steering control.

11. The vehicle traveling control method according to claim 8, wherein, while performing the first steering control, an override performed by a driver of the own vehicle is prioritized over the first steering control.

* * * * *